Dec. 1, 1959 J. CHECKON 2,915,263
TRACK SWITCH AND RERAILER
Filed April 20, 1954 2 Sheets-Sheet 1
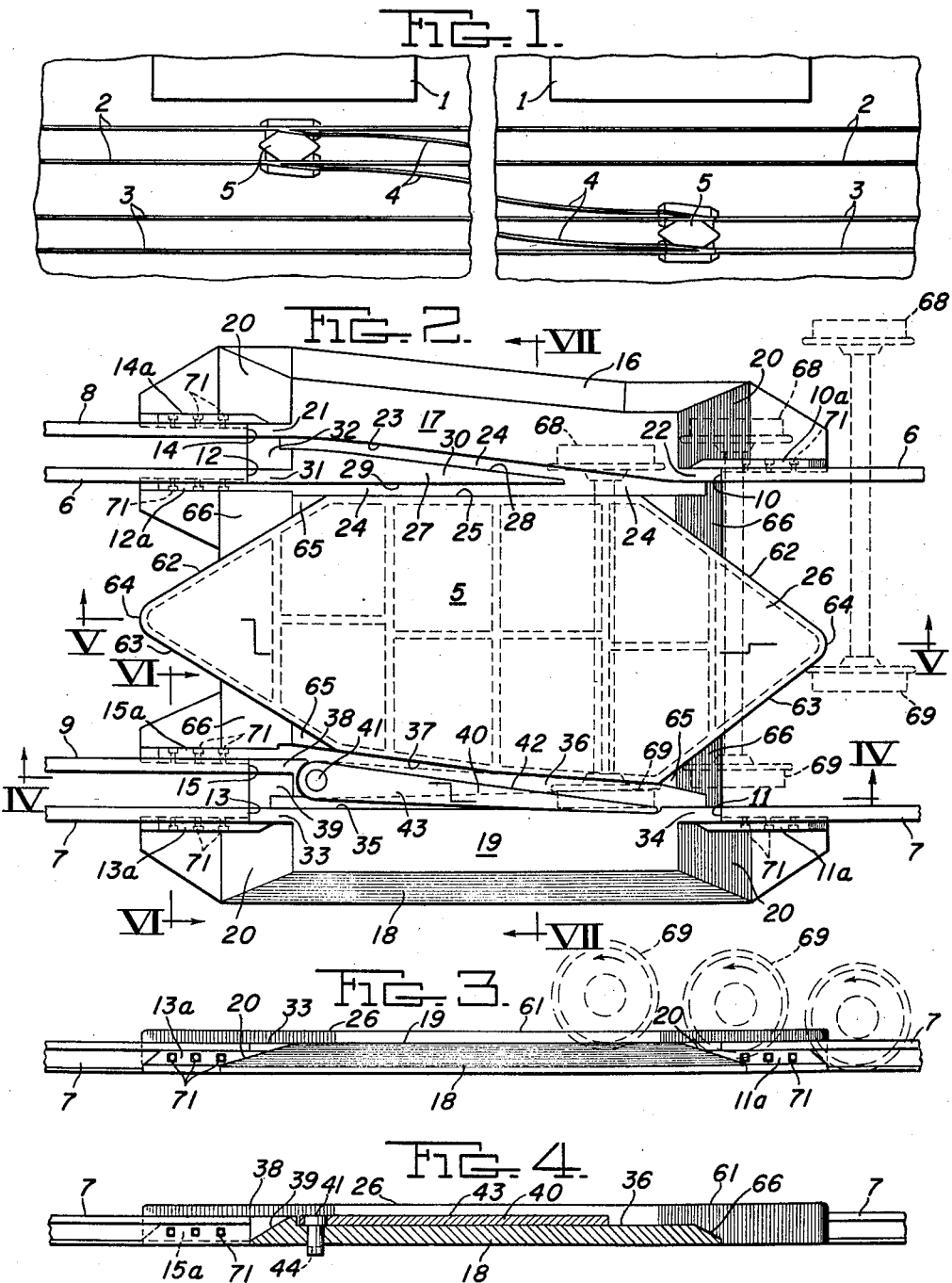
INVENTOR:
JOHN CHECKON,
BY: Donald G. Dalton
his Attorney.

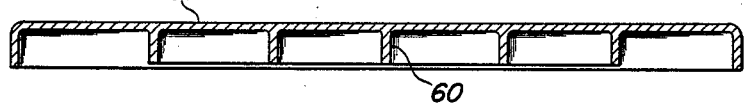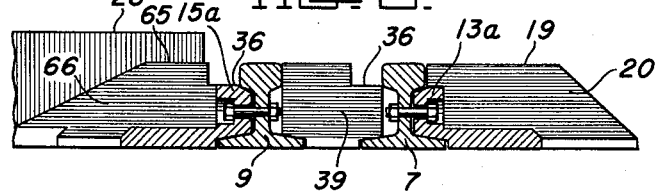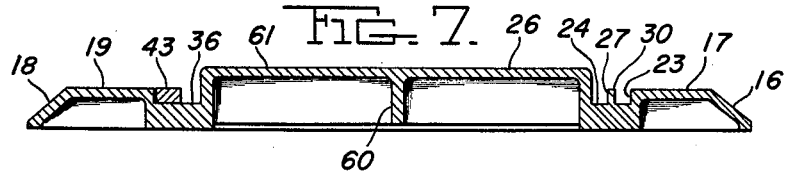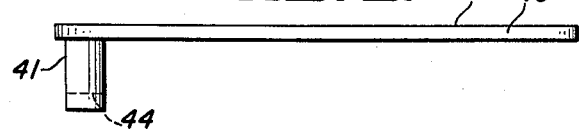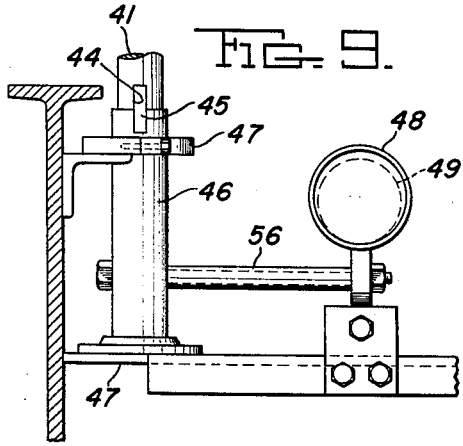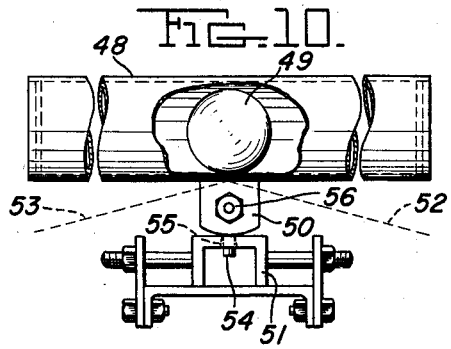
INVENTOR:
JOHN CHECKON,
BY: Donald G. Dalton
his Attorney.

United States Patent Office 2,915,263
Patented Dec. 1, 1959

2,915,263

TRACK SWITCH AND RERAILER

John Checkon, Gary, Ind., assignor to United States Steel Corporation, a corporation of New Jersey Application April 20, 1954, Serial No. 424,380

2 Claims. (Cl. 246—423)

This invention relates, as indicated, to a track switch and rerailer, and, more particularly, to a switching and rerailing apparatus which is adapted for use in the charging car track rails of open hearth furnaces.

Spillage of scrap from open hearth charging cars presents two troublesome problems. First, the scrap spillings accumulate in the deep space on the open sides of conventional switch point turnouts and prevent proper operation of branch track switches unless the accumulated scrap is removed to permit free operation of the switch points. This condition is a frequent cause of derailing and breakage of switch points. Second, derailing of the car track wheels is caused by scrap particles on the tread surfaces of the track rails, and derailing, regardless of the cause, requires the use of rerailing apparatus of the type, for example, shown in United States Patent No. 2,354,473. The installation of rerailing apparatus further necessitates breaks in the main tracks at the points at which it is to be installed.

One of the principal objects of this invention is to provide an apparatus having both switching and rerailing instrumentalities to thereby reduce the number of breaks in the main track rails required by conventional constructions for this purpose.

A further object is to provide an improved track switch which is received in an open section of the main track rails to form a continuation of the main track rails and a turnout connection to branch track rails and which is constructed with ramps for rerailing flanged car wheels at its point of installation.

Another object of the invention is to provide a track switch and rerailer having turnout switch points with self-cleaning characteristics by which movement of the car wheel flanges through the spaces alongside the switch points is effective to clear such space of scrap particles which may have collected therein.

Other objects and advantages of the invention will be apparent from the following description.

In the drawings, there is shown a preferred embodiment of the invention. In this showing:

Figure 1 is a diagrammatic plan view of an open hearth installation showing the arrangement of the charging tracks with respect thereto and illustrating the manner in which the track switch and rerailer of this invention is connected therein;

Figure 2 is an enlarged plan view of one of the track switches and rerailers shown in Figure 1;

Figure 3 is a side elevation of the apparatus shown in Figure 2;

Figure 4 is a sectional view taken substantially along the line IV—IV of Figure 2;

Figure 5 is a sectional view taken along the line V—V of Figure 2;

Figure 6 is an enlarged detail sectional view taken along the line VI—VI of Figure 2;

Figure 7 is a transverse sectional view taken along the line VII—VII of Figure 2;

Figure 8 is a side elevational view of the pivotal switch point used in the track switch and rerailer shown in Figure 2;

Figure 9 is an elevational view of the operating mechanism for the switch point shown in Figure 8; and Figure 10 is a partial and fragmentary elevation of a portion of the apparatus shown in Figure 9 looking in a direction from the right of Figure 9.

Referring to Figure 1 of the drawings, a battery of open hearth furnaces 1 are shown as having a pair of main rail tracks 2 and 3 running along the front thereof. The provision of the second track 3 outwardly of the track 2 is desirable in order that charging cars filled with scrap may be delivered to selected ones of the furnaces 1 beyond charging cars which may be blocking the tracks 2 in front of other furnaces. Branch tracks 4 are provided at spaced intervals along the main rail tracks over which charging cars may be switched between the main rail tracks. At each of the connections of the branch tracks with the main tracks, there is provided a track switch and rerailer designated as a whole by the numeral 5 and constructed in accordance with the principles of this invention.

The enlarged showing of the track switch and rerailer 5 in Figure 2 is a showing of the one connected in the main track 3 in Figure 1. In this showing, the rails of the main track 3 are designated by the numerals 6 and 7 and the rails of the branch track 4 are designated by the numerals 8 and 9. The track switch and rerailer 5 forms a connector apparatus which completes an interrupted section in the main track rails 6 and 7 and provides a switching connection of the branch track rails 8 and 9 to the main track rails 6 and 7 in the interrupted section thereof. As shown in Figure 2, the main track rails 6 and 7 terminate at the points 10 and 11 at one end of the connector 5 and terminate at the points 12 and 13 at the other end of the connector 5. The branch rails 8 and 9 terminate at the points 14 and 15 which are respectively spaced laterally with respect to the ends 12 and 13 of the main track rails 6 and 7.

The connector 5 has provisions for connection with the ends 10—15 of the track rails. As best shown in Figures 2, 3 and 6, such connecting provisions comprise flanges respectively designated 10a—15a and projecting outwardly from the ends of the connector 5 for connection with the ends of the rails having the terminal points respectively designated 10—15. Each of the flanges 10a—15a has a plurality of openings 71 for the reception of bolts (not shown) for fastening the ends of the rails to such flanges as best shown in connection with the flanges 13a and 11a in Figure 3. At the one end of the connector 5, it will be noted that the rails 6 and 8 and the rails 7 and 9 are arranged in laterally spaced pairs with the branch rail 8 spaced outwardly of the main rail 6 and the branch rail 9 spaced inwardly of the main rail 7. The connection provisions 12a and 14a for the rails 6 and 8 are similarly spaced laterally with respect to each other, and the connection provisions 13a and 15a for the rails 7 and 9 are also spaced laterally with respect to each other.

At one side of the connector 5 a platform 16 having a tread surface 17 provides a connection between the rails 6 and 8. At the other side of the connector 5, a platform 18 having a tread surface 19 provides a connection between the main rails 7. The tread surfaces 17 and 19 are at the same horizontal level as the tread surfaces of the rails connected thereby and thus form a surface over which the treads of flange car wheels may roll between the rails connected thereby. Inclined ramps 20 are provided at the ends of the platforms 18 and 19 over which the flanges of derailed car wheels may roll to a position supported on the surfaces 17 and 19 in a manner to be described.

The tread surface 17 has portions 21 and 22 at opposite ends thereof which respectively join with the end 14 of the branch rail 8 and with the end 10 of the main rail 6. The inner edge of the tread surface 17 is defined by a vertically depending guide wall 23 which extends between the inner edges of the rails 6 and 8 and forms a guide for the flanges of the wheels of the car moving over the rails 6 and 8. A lower platform surface 24 extends inwardly from the lower edge of the guide wall 23 to the edge 25 of a rerailing platform 26. The platform surface 24 is spaced below the level of the tread surface 17 a distance corresponding to the radial dimension of the car wheel flanges so that when a car wheel flange is resting on the surface 24, its tread will be at the same vertical level as the tread surface 17. A switch point 27 is integrally connected with and projects upwardly from the surface 24 with its heel arranged in the space between rail tread extensions 21 and 31 and its point projecting toward the main track rail 6 at the other end of the connector 5. The switch point 27 has one edge 28 positioned inwardly from and parallel to the flange guide 23 and its other edge 29 in line with and forming an extension of the inner edges of the tread surfaces of the main rails 6, the edge 29 being spaced from the edge 25 of the rerailing platform 26. The upper surface 30 of the switch point 27 is on a level flush with the tread surface 17 and has an extension 31 at one end thereof joining it to the end 12 of the rail 6. A rerailing ramp 32 is positioned between the rail tread surface extensions 21 and 31. The surface 30 of the switch point 27 provides a tread surface over which the treads of flange car wheels are supported when moving between the rail sections 6.

The tread surface 19 on the other side of the connector 5 has portions 33 and 34 at opposite ends thereof which connect and form continuations of the tread surfaces of the main rails 7. The inner edge of the tread surface 19 is defined by a vertically depending guide wall 35 which extends between the inner edges of the tread surfaces of the rails 7 and forms a guide for the flanges of a car wheel moving between the rails 7. A lower platform surface 36 extends inwardly from the lower edge of the flange guide wall 35 to the edge 37 of the rerailing platform 26. The surface 36, similarly to the surface 24, is spaced below the tread surface 19 a distance corresponding to the radial dimension of the car wheel flanges so that when a car wheel flange is supported on the surface 36 its tread will be at the same vertical level as the tread surface 19. A part 38 extends upwardly from one end of the surface 36 and forms a continuation of the tread surface of the branch rail 9. Intermediate the tread surface portions 33 and 38, a rerailing ramp 39 is provided.

A switch point 40 is mounted on the surface 36 with its heel arranged generally in the space at the ends of the tread surfaces 33 and 38 of the rails 7 and 9 at one side of the connector and with its point projecting toward the rail section 7 at the other side of the connector. A pivot 41 rigidly secured with the heel of the switch point 40 mounts it for pivotal movement over the surface 36 from the position shown in solid lines to the position shown in dotted lines. In the position shown in solid lines, the edge 42 extends angularly between the inner edges of the tread surfaces of the rails 9 and 7 and forms a guide surface engageable with the flanges of a car wheel for switching a car moving from right to left as viewed in Figure 2 from the main track to the branch track, the edge 35 being recessed as shown to receive the point of the switch point 40 when in this position. When the switch point 40 is in the position shown in dotted lines, it is ineffective to perform a switching action of this nature and the tread of the car wheels will roll over the surfaces 19 and 30 so that the car will continue its movement over the main tracks. The flanges of a car wheel moving from left to right over the branch track 9 will automatically cam switch point 40 to the position shown in solid lines if it is not already in that position, and a car wheel moving from left to right over the track 7 will cam the switch point 40 to the position shown in dotted lines. As best shown in Figures 7 and 8, the switch point 40 has a depth such that its surface 43 is positioned above the surface 36 a distance corresponding to the radial dimension of the car wheel flanges so that it forms a tread surface for the treads of a car wheel when it is in the position shown in solid lines in Figure 2.

As shown in Figures 4 and 8, the pivot 41 projects downwardly through an opening in the portion of the platform providing the surface 36 and has a slot 44 in its lower end in which is received an actuator lug 45 (see Figure 9) secured in the upper end of a rotatable actuator 46. The actuator 46 extends vertically and is supported for rotation in brackets 47 secured to a substructure for the tracks. Rotation of the actuator post 46 and pivotal movement of the switch point 40 between limited positions is biased by an elongated tube 48 having a steel ball 49 mounted for gravitational movement therein from one end thereof to the other. The center of the tube 49 has a rocker 50 mounting it for rocking movement on a stationary support 51 from the position shown in solid lines to either of the angularly inclined positions designated by the dotted lines 52 and 53, a pin 54 secured to and projecting downwardly from the rocker 50 through a tapered opening 55 in the support 51 being effective to limit the rocking movement of the tube 48. By reason of the weight of the steel ball 49 and the manner in which it gravitates from one end of the tube to the other, the tube 48 will always tend to move to one of its angularly inclined positions designated by the dotted lines 52 and 53. Rocking movement of the tube 48 is effective to impart limited angular rotational movement to the actuator 46 through a rod 56 having one end secured to the rocker 50 and its other end secured to the post 46. In this manner, tilting movement of the tube 48 to either of its limited positions together with the gravitational effect of the steel ball 49 therein provides a bias for moving the switch point 40 to either of its two operating positions respectively shown in solid and dotted lines in Figure 2. The tube 48 in practice will never occupy a neutral or balanced position as shown in solid lines in Figure 10 with the switch point 40 in a centered position between its operative positions but will move to one of its angularly inclined positions with the switch point 40 in one or the other of its operative positions. If desired, mechanical means such as cables may be attached to the tube 48 for effecting a tilting movement thereof to thereby move the switch point 40 to its operative positions.

The rerailing platform 26 forms a connection between the end platforms 16 and 18 and has somewhat the same purpose as the similar platform of the rerailer structure disclosed in Patent No. 2,354,473 to A. A. Neubaum et al. As shown in Figures 5 and 7, the platform is a cast hollow structure having reinforcing ribs 60 and its upper surface 61 positioned well above the level of the tread surfaces 17 and 19 and the tread surfaces of the rails. The ends of the platform 26 respectively have the shape of an isosceles triangle providing guide surfaces 62 and 63 which converge from a point 64 centrally of the rails to the ends of the side surfaces 25 and 37. At the intersections of the guide surfaces with the side surfaces 25 and 37, horizontal platforms 65 are provided at the upper edges of rerailing ramps 66. The platforms 65 are on substantially the same level as the lower flange supporting surfaces 24 and 36 so that the flanges of a wheel will roll thereover onto the flange supporting surfaces 24 and 36.

The manner in which the rerailing platform 26 is effective to rerail car wheels will be best understood by considering the action which takes place as the car wheels 68 and 69 of a car truck move from right to left in Figure 2. As the car wheels are pulled to the left, the flange of the wheel 69 will strike the inclined surface 63 and continued forward movement of the car wheels will result in their movement being cammed laterally to a position in which they roll into engagement with the rerailing ramps 20 and 66 which is the second position of the wheels 68 and 69 in Figure 2. As the wheels roll up the ramps 66 and 20, a further lateral camming movement is effected by the surface 63 so that the wheel 69 is moved to a position in which its flange is supported on the lower platform surface 36, this condition being indicated by the third position of the wheel 69 in Figure 2. In this position, the tread of the wheel 69 will engage either with the tread surface 43 of the switch point 40 or with the tread surface 19 of the platform 18 depending upon the position of the switch point 40. Continued forward movement will cause the wheel 68 to roll to a position with its flange supported on the lower platform surface 24. A similar action is effected by the platform 26 and the ramps 66 and 20 at the other end of the connector 5. In the event that the derailed truck wheels are positioned between the rails 6 and 8 and the rails 7 and 9, the ramps 32 and 39 will be effective to elevate the wheels to a position in which the wheel 68 has its flanges supported on the switch point surface 24 and in which the wheel 69 has its flange supported on the switch point surface 43 or the lower platform surface 36 in the case of a car moving from left to right, and continued movement of the car wheels from left to right will cause the flanges to roll off the switch point surfaces 30 and 43 onto the lower platform surfaces 24 and 36 in the event that they are not already on such surfaces.

While the switch point 27 has been shown as integrally connected with the platform surface 24 and the switch point 40 is shown as having a pivotal support on the platform surface 36, it will be understood that both switch points may be made pivotal. In such case, the heel of the switch point 27 will be provided with a pivotal connection and both points will be tied together for simultaneous pivotal movement.

From the foregoing, it will be apparent that the connector 5 of this invention provides a connection in the interrupted section of the main track rails 6 and 7 and is effective also to provide a switching connection for the branch track rails 8 and 9 with the main track rails in the interrupted portion thereof. The construction of the connector 5 in the form of a platform having ramps at the ends thereof in addition provides for rerailing of car wheels as they approach the connector. In accordance with the preferred embodiment of the invention, it will be noted that an adequate switching connection is provided through the use of two switch points one of which is stationary and the other of which is pivotally movable for the purpose of providing the necessary switching action.

With respect to the action of the switch points 27 and 40, attention is particularly directed to the fact that the vertical depth of the platform surfaces 24 and 36 below the upper surfaces 30 and 43 is extremely shallow and is no greater than the radial dimension of the car wheel flanges. By reason of the shallow depth of the spaces along either side of the switch points 27 and 40, movement of the car wheel flanges through such spaces is effective to clear the surfaces 24 and 36 of particles of scrap which may have fallen therein and thus render such particles ineffective to derail the car wheels or interfere with pivotal movement of the switch point 40. This feature is particularly desirable in that it eliminates the cause of switch point breakage common to conventionally constructed switch points.

While one embodiment of my invention has been shown and described it will be apparent that other adaptations and modifications may be made without departing from the scope of the following claims.

I claim:
1. In a switching and rerailing apparatus for connecting an interrupted section of a pair of main track rails and for providing a switching connection for a pair of branch track rails with the main track rails in the interrupted section thereof, a switching connector for insertion in said interrupted section and having a pair of laterally spaced rail connector platforms at opposite sides thereof, each of said platforms having provisions at opposite ends thereof for connection in one of the rails of the main track and a provision at one of said ends for connection to a rail of the branch track, said one end of each of said platforms having its branch and main rail connecting provisions spaced laterally with respect to each other, one of said platforms having a wheel tread surface extending between the connecting provisions for a branch rail and a main rail on one side of the apparatus and the other of said platforms having a wheel tread surface extending between the connecting provisions for the main rail on the other side of the apparatus, said platforms having inwardly facing vertical flange guiding surfaces at the inner edges of and extending downwardly from their respective tread surfaces, and flangeway surfaces for supporting engagement with the car wheel flanges respectively extending inwardly from the bottom of each of said flange guiding surfaces, each of said flangeway surfaces being spaced vertically below said tread surfaces a distance corresponding to the radial dimension of the car wheel flanges, each of said flangeway surfaces having a switch point thereon with its heel arranged in the space between one of said laterally spaced pairs of connecting provisions and having a vertical dimension above the flangeway surfaces equal to the radial dimension of the car wheel flanges, at least one of said switch points having a pivot connecting its heel with the flangeway surface on which it is positioned, means for rotating said pivot to operate said one switch point, and a rerailing platform positioned between said laterally spaced rail connector platforms, each of said laterally spaced and rerailing platforms having rerailing ramps at opposite ends thereof over which the flanges of derailed car wheels may roll onto said connector platforms.

2. An apparatus as claimed in claim 1 characterized by said rerailing platform having opposite ends thereof shaped in the form of a point to provide a pair of guide surfaces which diverge toward and intersect with the ends of flangeway surfaces at the ends of said laterally spaced platforms, said guide surfaces being respectively adapted for guiding engagement with derailed car wheels to guide their movement onto said flangeway supporting surfaces.

References Cited in the file of this patent
UNITED STATES PATENTS

| | | |
|---|---|---|
| 53,357 | Stowell | Mar. 20, 1866 |
| 328,842 | Ford | Oct. 20, 1885 |
| 569,066 | Shockley | Oct. 6, 1896 |
| 577,242 | Feltner | Feb. 16, 1897 |
| 797,772 | Hibbets | Aug. 22, 1905 |
| 816,308 | Farmer | Mar. 27, 1906 |
| 1,063,799 | Hughes | June 3, 1913 |
| 1,126,155 | Young et al. | Jan. 26, 1915 |
| 1,537,508 | Swift | May 12, 1925 |
| 2,354,473 | Neubaum et al. | July 25, 1944 |

FOREIGN PATENTS

| | | |
|---|---|---|
| 13,395 of 1908 | Great Britain | Mar. 18, 1909 |